United States Patent
Shukla (10) Patent No.: US 9,160,565 B2
(45) Date of Patent: *Oct. 13, 2015

(54) FRAGMENTATION OF LINK LAYER DISCOVERY PROTOCOL PACKETS

(75) Inventor: Vishal Shukla, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/454,894

(22) Filed: Apr. 24, 2012

(65) Prior Publication Data

US 2013/0176896 A1     Jul. 11, 2013

Related U.S. Application Data

(63) Continuation of application No. 13/344,045, filed on Jan. 5, 2012.

(51) Int. Cl.
*H04L 12/28* (2006.01)
*H04L 12/46* (2006.01)

(52) U.S. Cl.
CPC ............. *H04L 12/462* (2013.01); *Y02B 60/43* (2013.01); *Y02B 60/44* (2013.01)

(58) Field of Classification Search
USPC ............................ 370/474, 254, 255; 709/221
See application file for complete search history.

(56) References Cited

U.S. PATENT DOCUMENTS

| | | |
|---|---|---|
| 7,894,481 B2 | 2/2011 | van Greunen et al. |
| 8,279,788 B2 | 10/2012 | Diab |
| 8,402,120 B1 * | 3/2013 | Perkinson ...................... 709/221 |
| 8,472,438 B2 | 6/2013 | Kini et al. |
| 2003/0031177 A1 | 2/2003 | Robidas et al. |
| 2003/0210710 A1 * | 11/2003 | Odman .......................... 370/471 |
| 2006/0106753 A1 * | 5/2006 | Yoon et al. ........................ 707/1 |

(Continued)

FOREIGN PATENT DOCUMENTS

| | | |
|---|---|---|
| CN | 101459536 B | 6/2009 |
| CN | 102223278 A | 10/2011 |

(Continued)

OTHER PUBLICATIONS

International Search Report and Written Opinion in related international patent application No. PCT/IB2012/057306, mailed on May 16, 2013; 10 pages.

(Continued)

*Primary Examiner* — Kevin C Harper
*Assistant Examiner* — Derrick V Rose
(74) *Attorney, Agent, or Firm* — Schmeiser, Olsen & Watts LLP (57) ABSTRACT

Described are methods of communicating network device information between network devices. A communication is established between a first network device and a second network device according to a link layer discovery protocol (LLDP). The method further comprises an LLDP advertisement message is output in the communication from the second network device to the first network device. The first network device determines whether the second network device processes fragmented packets by searching the LLDP advertisement message for a fragmentation time length value (TLV) field. The second network device outputs to the first network device a plurality of packet fragments in response to a determination that the LLDP advertisement message includes the fragmentation TLV field.

14 Claims, 7 Drawing Sheets

(56) References Cited

U.S. PATENT DOCUMENTS

| | | |
|---|---|---|
| 2007/0254661 A1 | 11/2007 | Chowdhury et al. |
| 2008/0270588 A1 | 10/2008 | Sultan et al. |
| 2010/0166015 A1* | 7/2010 | van Greunen et al. ........ 370/474 |
| 2010/0177648 A1 | 7/2010 | Diab |
| 2010/0235665 A1 | 9/2010 | Diab |
| 2010/0278076 A1* | 11/2010 | Reddy et al. .................. 370/254 |
| 2011/0078222 A1* | 3/2011 | Wegener ....................... 708/203 |
| 2011/0261812 A1 | 10/2011 | Kini et al. |
| 2011/0261814 A1 | 10/2011 | Matthews et al. |
| 2013/0176892 A1 | 7/2013 | Shukla |
| 2013/0250810 A1* | 9/2013 | Ho et al. ....................... 370/255 |

FOREIGN PATENT DOCUMENTS

| | | |
|---|---|---|
| CN | 102223312 A | 10/2011 |
| KR | 1020060017091 A | 2/2006 |
| KR | 102006067110 | 6/2006 |
| WO | WO9700568 | 1/1997 |
| WO | 2009049503 A1 | 4/2009 |

OTHER PUBLICATIONS

Kannan, Magesh; "Design and Implementation of Composite Protocols"; Electronics and Communication Engineering; Anna University; Chennai, India, 1997 (126 pgs).

Notice of Allowance in related U.S. Appl. No. 13/344,045, mailed on Apr. 24, 2014; 13 pages.

Final Office Action in related U.S. Appl. No. 13/344,045, mailed on Jan. 22, 2014; 29 pages.

Non-Final Office Action in related U.S. Appl. No. 13/344,045, mailed on Oct. 10, 2013; 20 pages.

* cited by examiner

FRAGMENTATION OF LINK LAYER DISCOVERY PROTOCOL PACKETS

RELATED APPLICATIONS

This application is a continuation application claiming priority to and the benefit of the filing date of U.S. patent application Ser. No. 13/344,045, filed Jan. 5, 2012, titled "Fragmentation of Link Layer Discovery Protocol Packets," the contents of which are incorporated by reference herein in their entirety.

FIELD OF THE INVENTION

The present inventive concepts relate generally to a link layer protocol implemented in a data center environment. More particularly, the present inventive concepts relate to the fragmentation of a Link Layer Discovery Protocol (LLDP) packet comprising a plurality of type-length-values (TLVs).

BACKGROUND

LLDP is a well-known neighbor discovery protocol, which allows Ethernet network devices to advertise topology information such as device configuration and identification details to neighboring devices. For example, an Ethernet blade switch can advertise the presence of its ports, major capabilities, and a current status to other LLDP stations in the same LAN. LLDP transmissions occur on ports at regular intervals or whenever there is a relevant change to their status. The switch can also receive LLDP information advertised from adjacent LLDP-capable network devices. The information is exchanged via a plurality of TLVs provided in an LLDP packet during transmission.

As data center technologies evolve, the number of TLVs in an LLDP packet has increased along with the amount of information contained in the TLVs. However, the maximum frame size for transmitting an LLDP packet across an Ethernet network is 1522 bytes. Thus, the number of TLVs transmitted in a given single LLDP instance is limited.

SUMMARY

In one aspect, the invention features a method of communicating network device information between network devices. A communication is established between a first network device and a second network device according to a link layer discovery protocol (LLDP). The method further comprises outputting in the communication from the second network device to the first network device an LLDP advertisement message. The method further comprises determining by the first network device whether the second network device processes fragmented packets by searching the LLDP advertisement message for a fragmentation time length value (TLV) field. The method further comprises outputting from the second network device to the first network device a plurality of packet fragments in response to a determination that the LLDP advertisement message includes the fragmentation TLV field.

In another aspect, the invention features a method for processing LLDP packet fragments. The method comprises receiving by a peer network device a fragmentation TLV field indicating that a transmitting network device is configured to output a plurality of packet fragments. The method further comprises determining a total number of packet fragments from the fragmentation TLV field. The method further comprises receiving by the peer network device the plurality of packet fragments from the transmitting network device. The method further comprises reassembling by the peer network device the received plurality of packet fragments.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

An LLDP packet having an excessive number of TLVs increases the risk of a frame drop or data loss during transmission, in particular, when the combined size of the TLVs exceeds an Ethernet frame size, i.e., 1522 bytes. This is particularly challenging in data center environments, where Ethernet port densities are large, and where a large number of TLVs is required for communicating information related to the Ethernet ports. Data centers also typically include virtualization applications, requiring many physical I/O connections per server. A large number of TLVs is likewise required for communicating such information.

One approach to accommodating an increased number of TLVs is to change the LLDP state machine in the transmitting network bridge, router, switch, or related network device, for example, to modify the LLDP frame with regard to the number of TLVs. However, backward compatibility between LLDP peers, for example, an end station server and a bridge, cannot be assured.

In brief overview, a system and method are provided for separating the TLVs allocated to an LLDP packet into a plurality of LLDP fragments. Each fragmented packet is treated as an independent LLDP packet. Each fragmented packet includes a fragmentation TLV that includes information necessary for reassembly upon receipt by a destination network device, referred to as an LLDP peer. In this manner, the peer can wait for the receipt of all fragments before processing the TLVs of the packets as though the fragments are part of a single LLDP instance.

Figure 1:
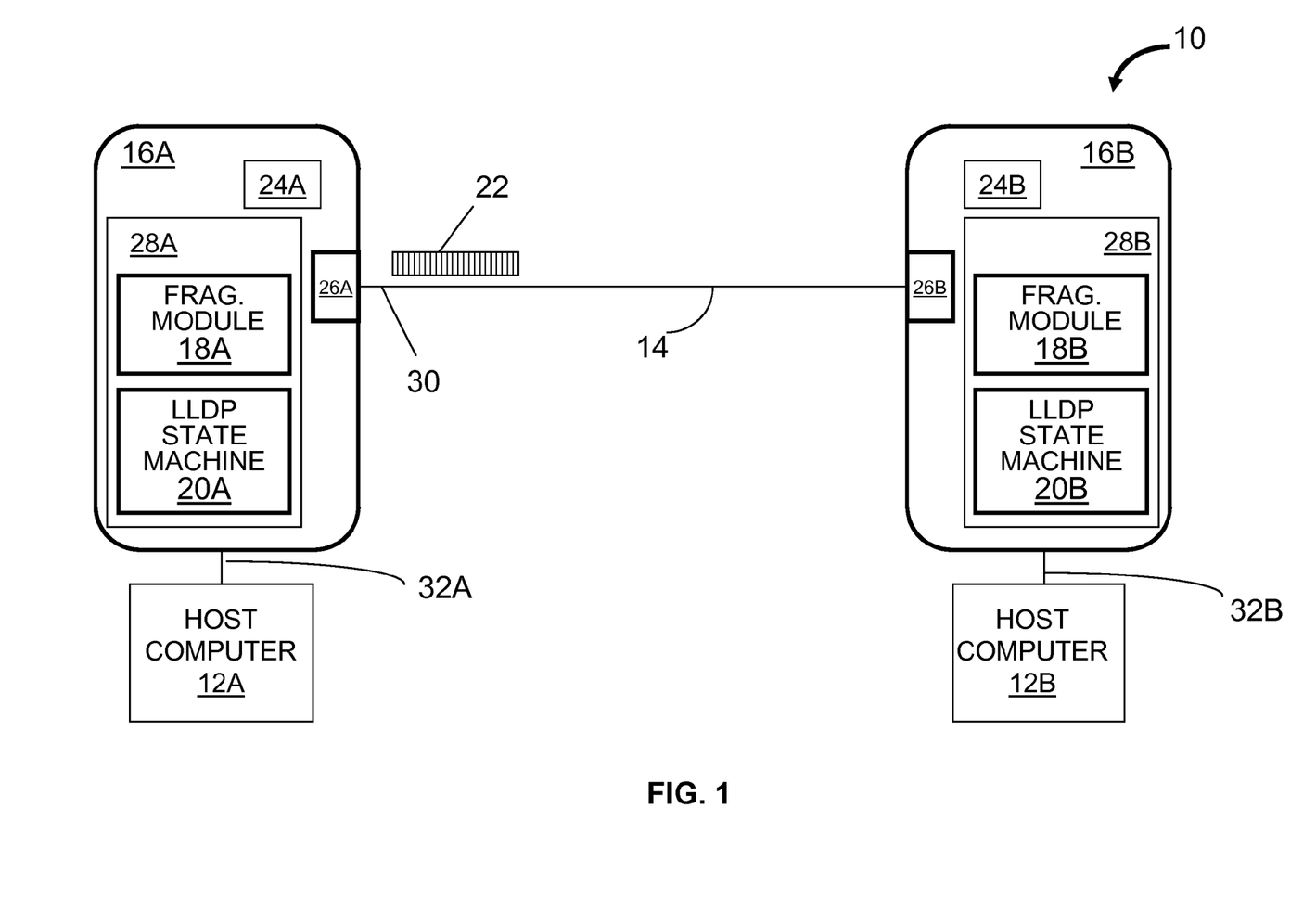
FIG. 1 is a block diagram of a data center environment in which embodiments of the present inventive concepts can be employed.

FIG. 1 is a block diagram of a data center environment 10 in which embodiments of the present inventive concepts can be employed. The data center environment 10 includes host computers 12A, 12B (generally, 12), each in communication with a network 14 via a network connectivity device, for example, an access switch 16A, 16B (generally, 16). Although not shown, the data center environment 10 can include other network devices, such as bridges, routers, aggregator switches, access switches, and the like, interposed between the access switches 16 and the network 14, and/or other well-known data center equipment. The network 14 can be a directly connected link, hub, layer 2 network, etc. between the access switches 16A, 16B. For example, the network 14 can include a link such as a fiber cable, a copper cable, and the like.

Each host computer 12 can be an embodiment of a physical computing device, such as a server or a blade. Each host computer 12 can reside alone or be installed in a chassis with other host computers, for example, as in a rack server or in a blade server. The host computers 12 can include one or more processing devices such as a CPU, a memory device such as RAM, RAM, or other storage media for storing program code, and a network interface (NIC), which communicate with each via one or more busses, connectors, adaptors, and the like known to those of ordinary skill in the art. The host computers 12 can run a virtualization system (not shown), which can optionally include a hypervisor or a virtual machine manager (VMM). In other embodiments, the host computers 12 can be non-virtualized servers or server blades.

The access switch 16A can include one or more processing devices 24A such as a CPU and a memory device 28A such as RAM, RAM, or other storage media for storing program code, for example, program code related to an LLDP state machine 20A and a fragmenting module 18A. The access switch 16A can be implemented as an Ethernet switch, for switching host computers between ports 26A, 32A for example, uplink and downlink ports, between virtual machines executing on the same host computer 12, or a combination thereof. An example implementation of a physical link 32A between the host computer 12A and the access switch 16A is a 10 Gb Ethernet link. The access switch 16B can have a same or similar configuration as the access switch 16A.

The LLDP state machine 20A generates an LLDP packet 22, which advertises details about the host computer 12A, such as device configuration, identification information, and the like, to other LLDP-compliant devices on the network 14, for example, access switch 16B. The LLDP fragmenting module 18A of the access switch 16A generates one or more LLDP fragments from the LLDP packet 22, depending on the size and number of TLVs in the LLDP packet 22. The LLDP packet 22 is transmitted over a link 30, or channel, to an LLDP peer, i.e., access switch 16B. The LLDP fragmenting module 18B reassembles the received LLDP fragments for performing subsequent operations, for example, to build a topology map.

Figure 2:
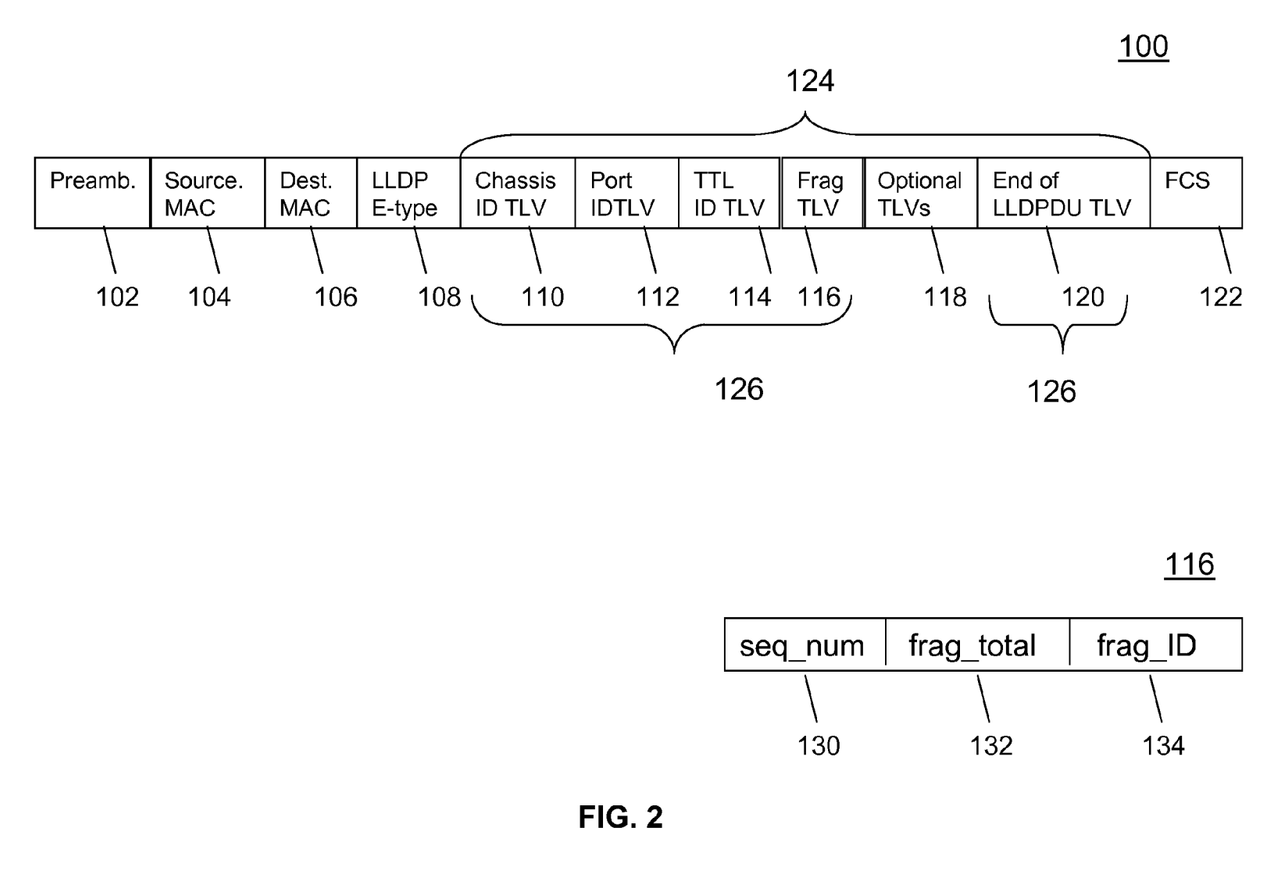
FIG. 2 is a block diagram of an LLPD packet encapsulated in an Ethernet frame, in accordance with an embodiment.

FIG. 2 is a detailed block diagram of LLPD packet data 124 encapsulated in an Ethernet frame 100, in accordance with an embodiment. The LLDP packet 22 shown in FIG. 1 can be included in the payload of the Ethernet frame 100, referred to as LLDP packet data 124. The LLDP packet data 124 is transmitted by host computer 12A in the Ethernet frame 100 to advertise its identity, capabilities, and neighbors.

The Ethernet frame 100 includes a preamble 102, a source MAC address field 104, a destination MAC address field 106, and a frame check sequence (FCS) field 122, which are well-known Ethernet frame elements and will not be described for reasons related to brevity. The Ethertype field 108 is also well-known for indicating which protocol, i.e., LLDP, is encapsulated in the payload of the Ethernet frame 100.

The LLDP packet data 124 includes several advertisement messages, each of which is included in a TLV. The TLVs of the LLDP packet data 124 include a set of mandatory TLVs 126, namely a chassis ID TLV 110, a port ID TLV 112, a time-to-live (TTL) TLV 114, and an end of LLDP PDU 120 TLV. The mandatory TLVs are well-known, and are therefore not described in detail herein for reasons related to brevity.

The LLDP packet data 124 includes a fragmentation TLV 116, or fragment TLV, which in an embodiment is a mandatory TLV 126 when an LLDP peer relationship is established between the network device transmitting device and the receiving network device. In another embodiment, an LLDP peer relationship is not established, wherein the TLV 126 is not transmitted. The fragment TLV 116 includes information related to the fragmentation of an LLDP packet. The fragment TLV 116 can be output as part of an LLDP packet to a peer port, which identifies the LLDP packet as being a fragmented packet, that is, a packet that provides contents such as TLVs in multiple packets in order to ensure that the TLVs do not exceed a maximum frame size of 1522 bytes. In this manner, the mandatory fragment TLV 116 can carry fragmented packet information so that when a peer port receives the fragment TLV 116, the receiving switch 16B acknowledges that fragmentation of the LLDP packet data 124 has occurred and waits for the remaining packet fragments before reassembling the fragments at the LLDP fragmenting module 18B.

The fragment TLV 116 includes a sequence number (seq_num) 130, a total fragment number (frag_total) 132, and a fragment ID (frag_ID) 134. The sequence number 130 identifies a particular LLDP instance. Accordingly, all fragments in an LLDP instance have the same sequence number. The total fragment number 132 refers to the number of fragments in an LLDP instance. The number of fragments can be determined by the transmitting network device, which divides the size of the combined TLVs by a maximum payload size, i.e., 1522 bytes. The fragment ID 134 is a variable that uniquely identifies each fragment in an LDAP instance.

Figure 3:
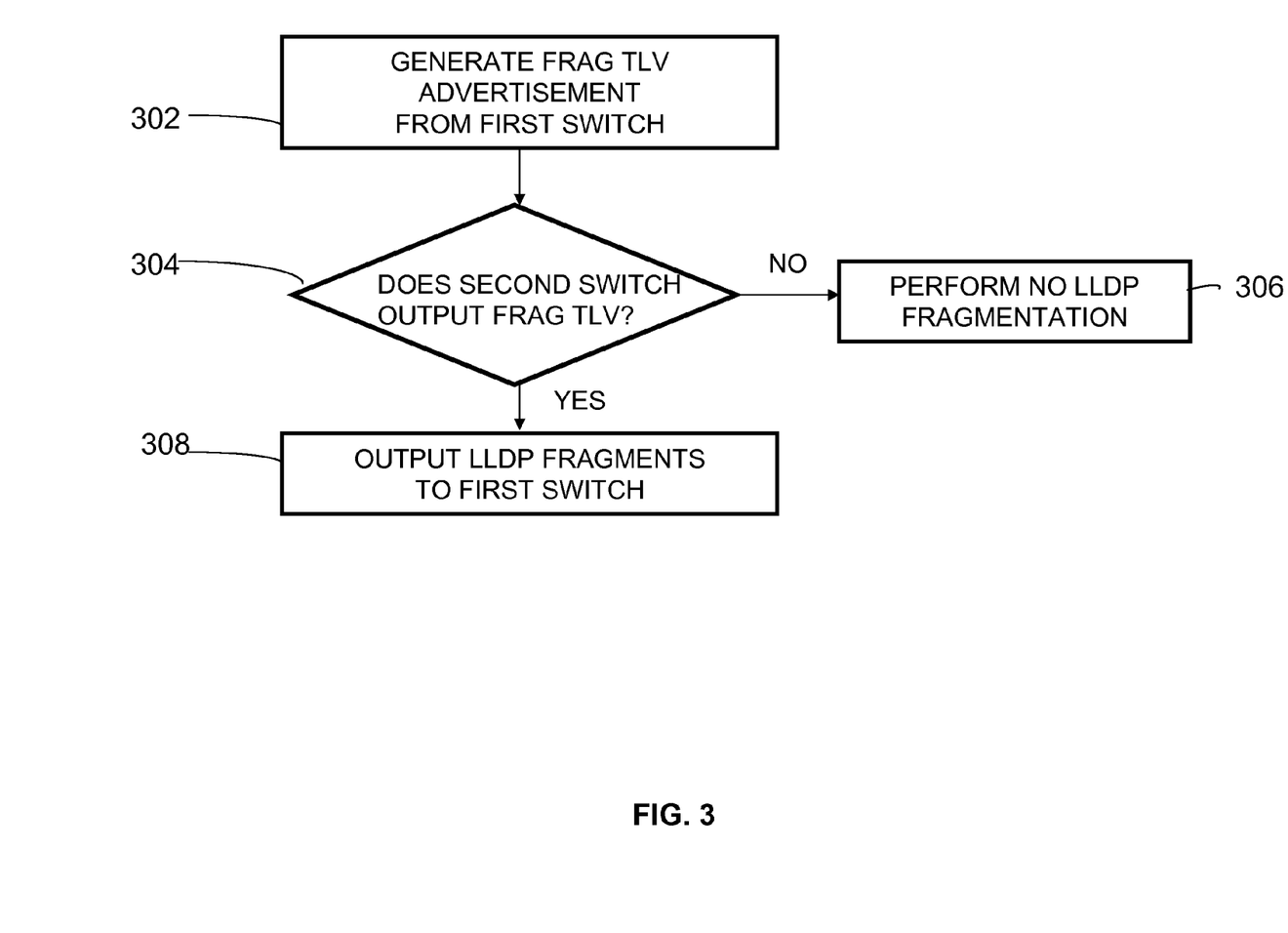
FIG. 3 is a flow diagram of a method for fragmenting an LLDP packet, in accordance with an embodiment.

FIG. 3 is a flow diagram of a method 300 for fragmenting an LLDP packet, in accordance with an embodiment. In describing the method 300, reference is made to FIGS. 1 and 2. Some or all of the method 300 can be performed on the access switches 16 shown in FIG. 1.

At step 302, the access switch 16A, referred to as a first switch, advertises to its peers via LLDP that the first switch 16A can process a plurality of LLDP packet fragments for a given LLDP instance. The fragmentation TLV advertisement can include a fragment TLV 116 having dummy attributes, for example, a sequence number (seq_num), a total fragment number (frag_total), and a fragment ID (frag_ID, or frag_num) each having a '0' value. In an embodiment, the fragment TLV 116 sent with the advertisement is a mandatory TLV. When each of the switches 16A, 16B send a mandatory fragment TLV to each other in an LLDP packet, a communication is established whereby each of the switches 16A, 16B supports the transmission and receipt of LLDP fragments.

At step 304, a determination is made whether the switch 16B, referred to as a second switch, supports LLDP packet fragmentation. For example, the first switch 16A can determine from an LLDP advertisement at step 302 received from the second switch 16B whether the second switch 16B supports LLDP packet fragmentation by establishing whether the LLDP advertisement includes a fragment TLV. If the second switch 16B outputs a fragment TLV, then it is established that the second switch 16B supports LLDP packet fragmentation, and the second switch can output (step 308) a set of LLDP fragments to the first switch 16A. For example, packet fragments can be generated when a determined TLV data payload exceeds a maximum frame size, for example, 1522 bytes. Each packet fragment is sent as an independent packet to the first switch 16A. The packet fragments can be the same or similar size, or can be of different sizes.

If a determination is made that the second switch 16B is not configured for packet fragmentation, for example, when the second switch 16B sends an LLDP packet to the first switch 16A that is absent a fragment TLV, at step 308, LLDP packet fragmentation does not occur in an exchange between the first switch 16A and the second switch 16B. Accordingly, all TLVs pertaining to a single LLDP instance are transmitted in a single packet.

Figure 4:
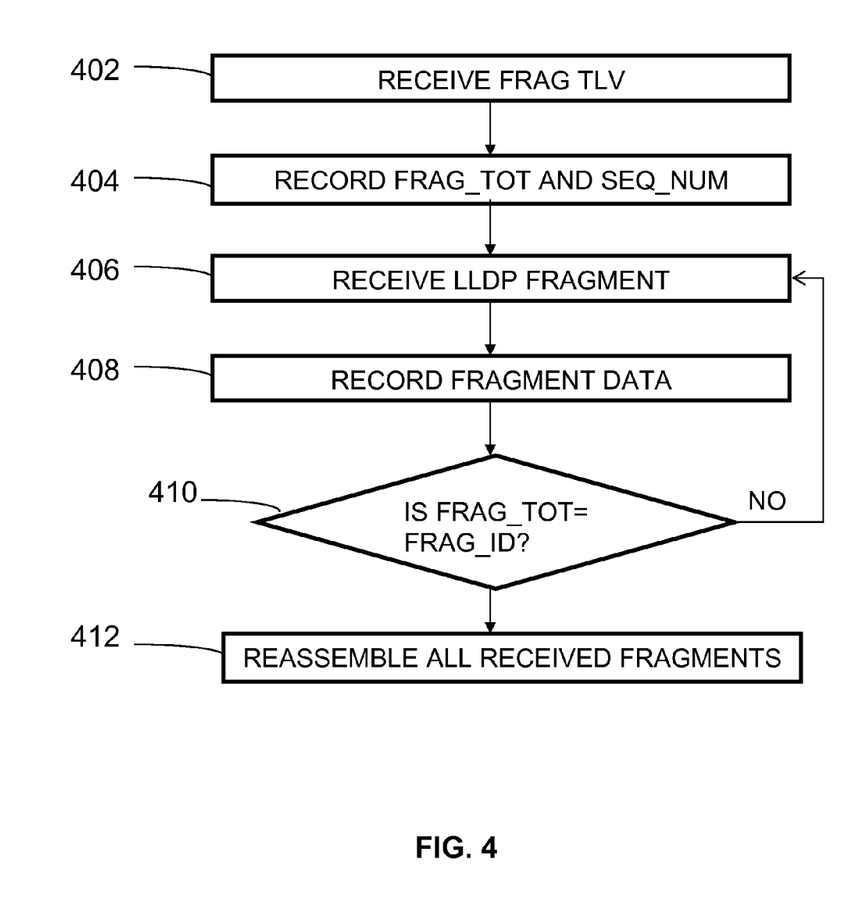
FIG. 4 is a flow diagram of a method for processing LLDP packet fragments, in accordance with an embodiment.

FIG. 4 is a flow diagram of a method 400 for processing LLDP packet fragments, in accordance with an embodiment. In describing the method 300, reference can be made to FIGS. 1-3. Some or all of the method 400 can be performed on the switches 16 shown in FIG. 1.

An LLDP peer relationship is established between the first switch 16A and the second switch 16B in a well-known manner, for example, during the exchange of LLDP advertisements.

At step 402, the first switch 16A receives and processes a fragment TLV sent by the second switch 16B. The first switch 16A can identify the received fragment TLV by the frag_ID, which has a value of 0, i.e., frag_ID=0. The first switch 16A records (step 404) the frag_total value and seq_num value provided with the fragment TLV.

At step 406, the first switch 16A receives an LLDP fragment from the second switch 16B.

At step 408, data provided in the received LLDP fragment is recorded, such data including the frag_total value and the seq_num value provided with the LLDP fragment, as well as TLV data provided with the LLDP fragment.

At step 410, a comparison is made between the frag_total value and the frag_ID of the LLDP fragment. If there is a match, i.e., the frag_total value and the frag_ID value are the same, then at step 412, the first switch reassembles all of the received LLDP packets having the same seq_num. Here, relevant applications can receive the TLV data. For example, a VLAN TLV can be provided to a VLAN database, an FCoE TLV can be provided to an FCoE module, and so on.

Figure 5:
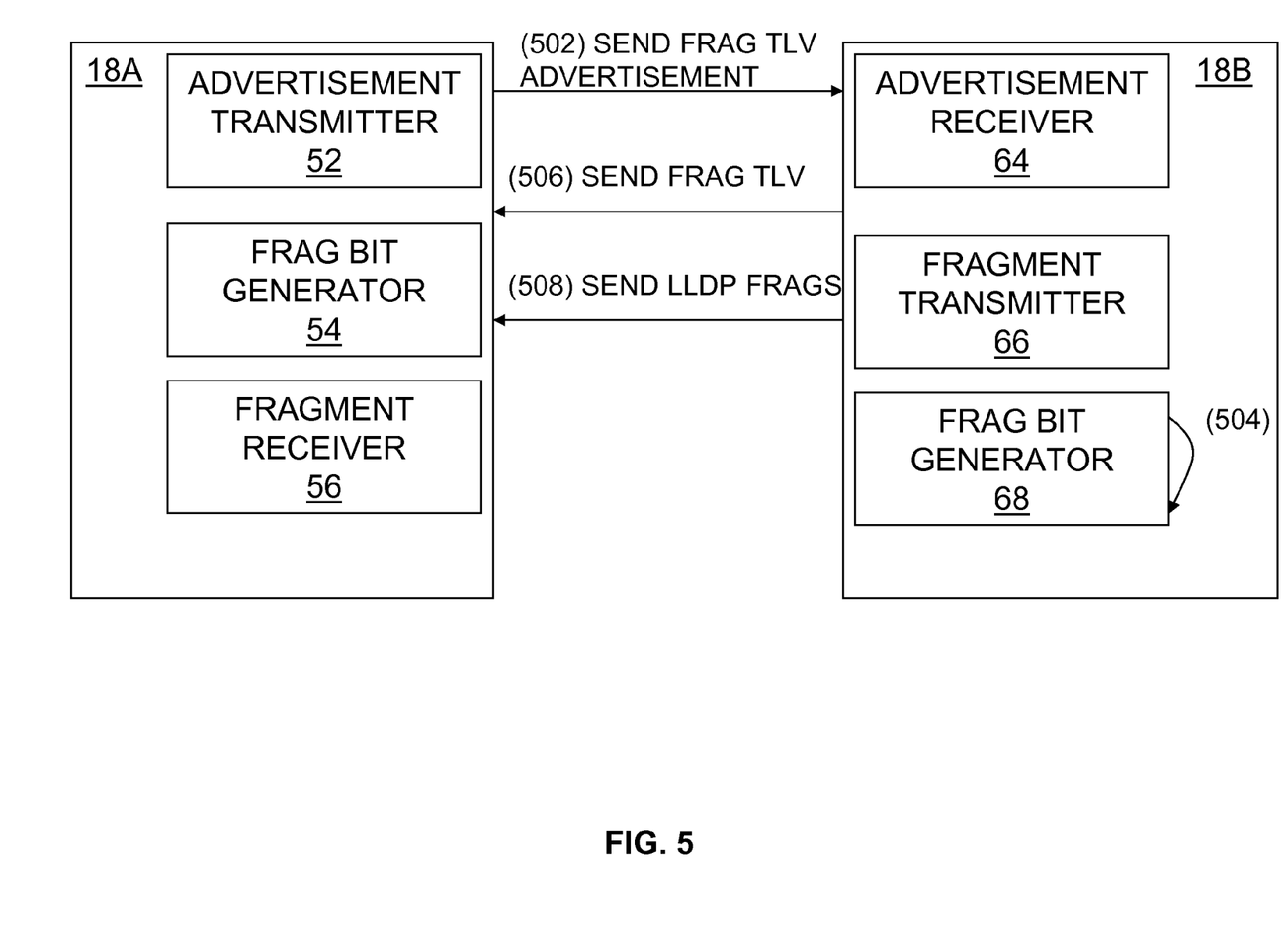
FIG. 5 is a block diagram of an LLDP packet exchange between the LLDP fragmenting module of the first switch and the LLDP fragmenting module of the second switch of FIG. 1, in accordance with an embodiment.

FIG. 5 is a block diagram illustrating an LLDP packet exchange between the LLDP fragmenting module 18A of the first switch 16A and the LLDP fragmenting module 18B of the second switch 16B of FIG. 1, in accordance with an embodiment. The LLDP packet exchange can be performed in accordance with method 300 and/or method 400 described herein.

As shown in FIG. 5, LLDP fragmenting module 18A, referred to as a first LLDP fragmenting module, includes an advertisement transmitter 52, a fragment bit generator 54, and a fragment receiver 56, and LLDP fragmenting module 18B, referred to as a second LLDP fragmenting module, includes an advertisement receiver 64, a fragment transmitter 66, and a fragment bit generator 68. Although not shown in FIG. 5, these elements of the LLDP fragmenting modules 18A and 18B are preferably included in the same fragmenting module so that a switch 16 can both transmit and receive packet fragments.

At step 502, a fragmentation TLV advertisement is output via the advertisement transmitter 52 of the first LLDP fragmenting module 18A and received by the advertisement receiver 64 of the second LLDP fragmenting module 18B. The fragmentation TLV advertisement can be encapsulated in a LLDP Data Unit (LLDPDU) in the TLV format.

At step 504, the fragment bit generator 68 of the second LLDP fragmenting module 18B sets a fragment bit, enabling the second LLDP fragmenting module 18B to generate LLDP packet fragments. The fragment bit of the first LLDP fragmenting module 18A is set by default, permitting LLDP advertisements to be generated that include a dummy fragment TLV field. The dummy fragment TLV field preferably includes a sequence number, a fragment total, and a fragment number, each having a value of 0.

The fragment transmitter 66 of the second LLDP fragmenting module 18B generates an initial LLDP packet that includes a fragment TLV and outputs (step 506) the LLDP packet to the first LLDP fragmenting module 18A.

The fragment transmitter 66 of the second LLDP fragmenting module 18B generates one or more packet fragments, each including TLVs, and sends (step 508) the packet fragments to the first LLDP fragmenting module 18A.

Figure 6:
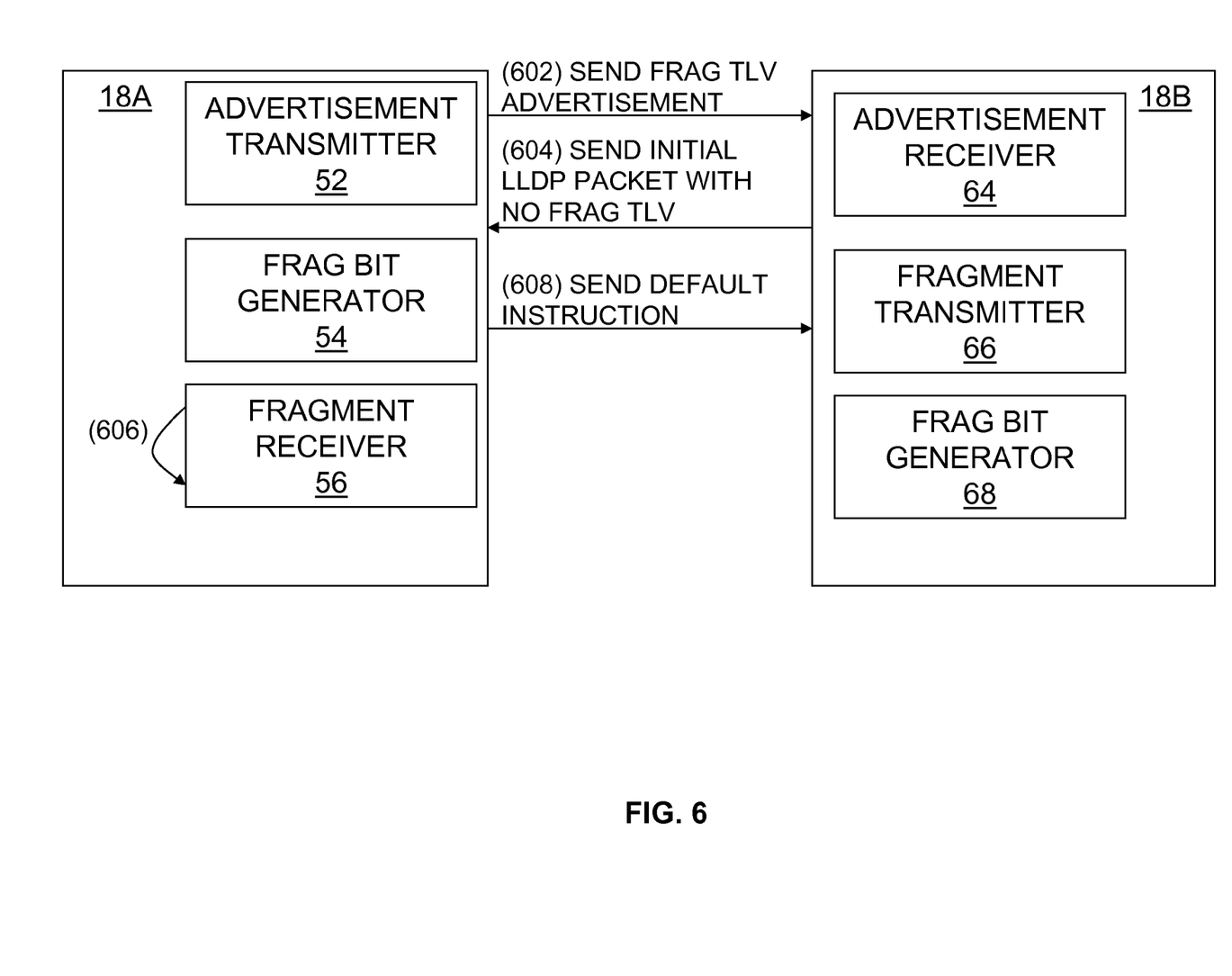
FIG. 6 is another block diagram of an LLDP packet exchange between the LLDP fragmenting module of the first switch and the LLDP fragmenting module of the second switch of FIG. 1, in accordance with an embodiment.

FIG. 6 is another block diagram illustrating an LLDP packet exchange between the LLDP fragmenting module 18A of the first switch 16A and the LLDP fragmenting module 18B of the second switch 16B of FIG. 1, in accordance with an embodiment.

At step 602, a fragmentation TLV advertisement is output via the advertisement transmitter 52 of the first LLDP fragmenting module 18A and received by the advertisement receiver 64 of the second LLDP fragmenting module 18B, similar to step 502 of FIG. 5.

At step 604, the fragment transmitter 66 of the second LLDP fragmenting module 18B outputs an initial LLDP packet to the first LLDP fragmenting module 18A. The initial LLDP packet does not include a fragmentation TLV field.

The fragment bit generator 68 of the second LLDP fragmenting module 18B does not set a fragment bit, since a fragmentation TLV is not processed. However, at step 606, the fragment bit generator 54 of the first LLDP fragmenting module 18A is set to off. At step 608, the first LLDP fragmenting module 18A communicates with the second LLDP fragmenting module 18B in a manner that does not include an exchange of packet fragments. Also, subsequent LLDP advertisement messages generated from the advertisement transmitter 52 do not include fragmentation TLVs. Accordingly, an LLDP-compliant network device in accordance with preferred embodiments provides backward compatibility with respect to communicating with peer devices that do not support LLDP packet fragmentation.

Figure 7:
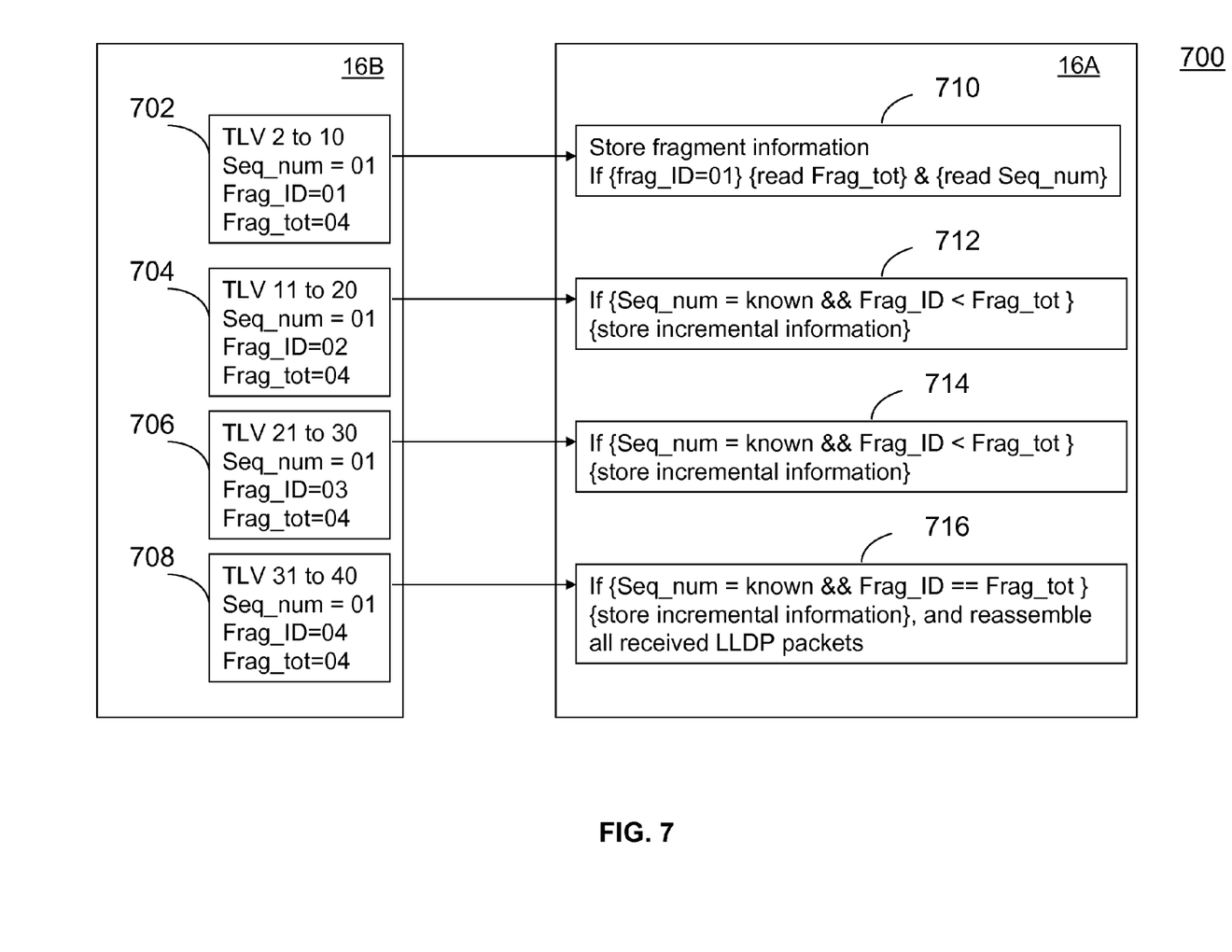
FIG. 7 is a block diagram of a plurality of packet fragments exchanged between the first switch and the second switch of FIG. 1, in accordance with an embodiment.

FIG. 7 is a block diagram 700 of a plurality of packet fragments exchanged between the first switch 16A and the second switch 16B of FIG. 1, in accordance with an embodiment. Prior to exchanging LLDP packet fragments, a peer relationship is established between the first switch 16A and the second switch 16B, where each first switch 16A and the second switch 16B indicates to the other via LLDP advertisements that LLDP packet fragmentation is supported.

A first LLDP packet fragment is transmitted at block 702 from the second switch 16B to the first switch 16A. The first switch 16A at block 710 stores the first LLDP packet fragment in memory, for example, storage device 28A. The first switch 16A can read the fragment ID (frag_ID) 134 to determine that the packet fragment is a first fragment (frag_ID=01). In response to this determination, the first switch 16A can read the sequence number 130, i.e., seq_num=01, and the total fragment number 132, i.e., frag_tot=04, from the fragment TLV 116 provided with the first LLDP packet fragment 702. The first LLDP packet fragment 702 can include TLVs 2-10, for example, a VLAN TLV.

A second LLDP packet fragment is transmitted at block 704 from the second switch 16B to the first switch 16A. The first switch 16A at block 712 reads the sequence number (seq_num) 130 and the total fragment number (frag_tot) 132 from the fragment TLV 116 provided with the second LLDP packet fragment 704. If the sequence number 130 is known and the fragment ID is less than the total fragment number 132, then the incremental information, for example, TLVs 11-20, is stored at the first switch 16A.

A third LLDP packet fragment is transmitted at block 706 from the second switch 16B to the first switch 16A. Similar to block 712, the first switch 16A at block 714 reads the sequence number (seq_num) 130 and the total fragment number (frag_tot) 132 from the fragment TLV 116 provided with the third LLDP packet fragment 706. If the sequence number 130 is known and the fragment ID is less than the total fragment number 132, then the incremental information, for example, TLVs 21-30, is stored at the first switch 16A.

A fourth LLDP packet fragment is transmitted at block 708 from the second switch 16B to the first switch 16A. The first switch 16A at block 716 reads the sequence number (seq_num) 130 and the total fragment number (frag_tot) 132 from the fragment TLV 116 provided with the fourth LLDP packet fragment 708. Here, a determination is made that the total fragment number is equal to the fragment ID, i.e., frag_tot==frag_ID=04. Here, the incremental information, for example, TLVs 31-40, in the fourth LLDP packet fragment is stored at the first switch 16A, and the received LLDP packet fragments 702, 704, 706, 708, are reassembled at the first switch 16A. The TLVs 2-40 can be provided to relevant applications. For example, a TLV 2-40 can include a VLAN TLV that is provided to a VLAN-related application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method of communicating network device information between network devices, comprising:
   establishing a communication between a first network device and a second network device according to a link layer discovery protocol (LLDP);
   outputting in the communication from the second network device to the first network device an LLDP advertisement message that includes a mandatory fragmentation time length value (TLV) field;
   determining by the first network device whether the second network device processes fragmented packets in response to determining that the LLDP advertisement message has the mandatory fragmentation TLV field;
   outputting from the second network device to the first network device a plurality of LLDP packet fragments in response to a determination that the LLDP advertisement message includes the mandatory fragmentation TLV field, wherein each LLDP packet fragment is output in a different LLDP packet, each LLDP packet fragment including a TLV payload, a combination of the TLV payloads of the LLDP packet fragments exceeding a predetermined thresholds;
   determining by the first network device that the LLDP advertisement message from the second network device is devoid of the fragmentation TLV field; and
   preventing by the first network device the output of subsequent LLDP advertisement messages indicating that the first network device processes packet fragments.

2. The method of claim 1, wherein at least one of the first and second network devices is a data center switch.

3. The method of claim 1, wherein the fragmentation TLV field is a mandatory TLV field.

4. The method of claim 1, wherein the predetermined threshold includes at least 1522 bytes of data.

5. The method of claim 1, wherein each packet fragment includes a fragmentation TLV field that includes information necessary for reassembly upon receipt by a destination network device.

6. The method of claim 5, wherein the fragmentation TLV field includes a sequence number, a total fragment number, and a fragment identifier.

7. The method of claim 6, wherein the first network device reassembles the received packet fragments in response to the first network device receiving a packet fragment having a fragmentation TLV field, and wherein the total fragment number is the same as the fragment identifier.

8. A method for processing LLDP packet fragments, comprising:
   receiving by a peer network device a mandatory fragmentation TLV field indicating that a transmitting network device is configured to output a plurality of packet fragments;
   determining a total number of packet fragments from the mandatory fragmentation TLV field;
   receiving by the peer network device the plurality of LLDP packet fragments from the transmitting network device;
   reassembling by the peer network device the received plurality of LLDP packet fragments, wherein each LLDP packet fragment is output in a different LLDP packet, each LLDP packet fragment including a TLV payload, a combination of the TLV payloads of the LLDP packet fragments exceeding a predetermined threshold;
   receiving by the peer network device an LLDP packet from the transmitting network device that is devoid of the fragmentation TLV field; and
   preventing by the peer network device the output of LLDP advertisement messages to the transmitting network device indicating that the peer network device permits the receipt of packet fragments.

9. The method of claim 8, wherein at least one of the transmitting network device and the peer network device is a data center switch.

10. The method of claim 8, wherein the fragmentation TLV field is a mandatory TLV field in an LLDP packet.

11. The method of claim 8, wherein the predetermined threshold includes at least 1522 bytes of data.

12. The method of claim 8, wherein the fragmentation TLV field includes a sequence number, a total fragment number, and a fragment identifier.

13. The method of claim 12, wherein the peer network device reassembles the received packet fragments in response to receiving a packet fragment having a fragmentation TLV field wherein the total fragment number is the same as the fragment identifier.

14. The method of claim 12, wherein the peer network device receives the fragmentation TLV field in a first LLDP packet, and wherein the peer network device subsequently receives the plurality of packet fragments.

* * * * *